United States Patent

[11] 3,593,946

[72] Inventor Peter R. D. Shardlow
Egham, Surrey, England
[21] Appl No. 840,430
[22] Filed July 9, 1969
[45] Patented July 20, 1971
[73] Assignee Tape Systems Limited
Egham, Surrey, England
[32] Priority July 10, 1968
[33] Great Britain
[31] 32995/68

[54] TAPE RECORDING AND/OR REPLAY MACHINE AND CASSETTE AND CARTRIDGE FOR USE THEREWITH
20 Claims, 10 Drawing Figs.

[52] U.S. Cl. 242/192, 242/55.19, 274/11
[51] Int. Cl. B65h 17/48, G03b 1/04, G11b 15/32
[50] Field of Search 242/55.19, 192, 197—200; 274/4, 11

[56] References Cited
UNITED STATES PATENTS

| | | | |
|---|---|---|---|
| 2,457,699 | 12/1948 | Marsen | 242/192 X |
| 3,235,194 | 2/1966 | Willis | 242/192 |
| 3,252,668 | 5/1966 | Miller et al. | 242/192 |
| 3,291,409 | 12/1966 | McClellan | 242/192 X |
| 3,497,157 | 2/1970 | Hanes et al. | 242/188 |
| 3,520,495 | 7/1970 | Sotani | 242/192 |

*Primary Examiner*—Leonard D. Christian
*Attorney*—Holman, Glascock, Downing and Seebold

ABSTRACT: A tape recording and/or replay machine having a slot into which a cassette or cartridge can be inserted. The cassette has two spools, flanges of which project through opposite sidewalls of the cassette whereas the cartridge has a single spool a flange of which projects through a sidewall of the cartridge. Both the cassette and the cartridge have a tape guidance system including a spring pinch wheel. The machine has a motor driven capstan, a continuously driven first drive wheel which engages the projecting flange of one spool when a cassette is inserted into the slot and the projecting flange of the spool when a cartridge is inserted into the slot. A second drive wheel of the machine engages the projecting flange of the other spool when the cassette is inserted into the slot. For rewind the first drive wheel is moved out of engagement with the flange it normally engages and the second drive wheel is coupled to the motor and drives the tape in the reverse direction.

INVENTOR
PETER ROBERT DIGBY SHARDLOW
BY Holman, Glascock, Downing & Seebold
ATTORNEYS INVENTOR
PETER ROBERT DIGBY SHARDLOW
BY Holman, Glascock, Downing & Seebold
ATTORNEYS INVENTOR
PETER ROBERT DIGBY SHARDLOW
BY Holman, Glascock, Downing & Seebold
ATTORNEYS INVENTOR
PETER ROBERT DIGBY SHARDLOW
BY Holman, Glascock,
Downing & Seebold
ATTORNEYS INVENTOR
PETER ROBERT DIGBY SHARDLOW
BY Holman, Glascock, Downing & Seebold
ATTORNEYS INVENTOR
PETER ROBERT DIGBY SHARDLOW
BY Holman, Glascock, Downing & Seebold,
ATTORNEYS INVENTOR
PETER ROBERT DIGBY SHARDLOW
BY Holman, Glascock, Downing & Seebold
ATTORNEYS

TAPE RECORDING AND/OR REPLAY MACHINE AND CASSETTE AND CARTRIDGE FOR USE THEREWITH

This invention relates to tape recording and/or replay machines and to cassettes and cartridges for use therewith.

According to one aspect of this invention there is provided a tape recording and/or replay machine comprising a slot into which it is intended that there shall be inserted a cassette comprising a tape, two rotatable spools between which the tape extends and which are located side-by-side, a pinch wheel and a container in which the spools and the pinch wheel are mounted, flanges of the two spools projecting through opposite sidewalls of the container or a cartridge comprising an endless tape, a pinch wheel, a rotatable spool, guide means for guiding the tape in a path which extends from the inner end of a stack of tape on the spool, past the pinch wheel to the outer end of the stack, and a container in which the spool, the pinch wheel and the guide means are disposed and through one sidewall of which one flange of the spool projects, the machine including a replay head connected to a loudspeaker, a motor, a capstan coupled to the motor, a first drive wheel urged into engagement with the projecting flange of one spool when a cassette is inserted into the slot and into engagement with the projecting flange of the spool when a cartridge is inserted into the slot, a transmission interconnecting the first drive wheel and the motor, and a second drive wheel which is urged into engagement with the projecting flange of the other spool when a cassette is inserted into the slot, and means for coupling the second drive wheel to the motor and for moving the first drive wheel out of engagement with the said flange of one spool, the first and second drive wheels serving to cause the tape to be driven in opposite directions.

Preferably the second drive wheel is mounted so that it can move into and out of the path of the cassette or cartridge when it is inserted into the slot and is spring-urged into the said path.

Preferably the said means include a flywheel coupled to the motor, a rotatable member, a belt transmission which couples the rotatable member to the drive wheel and operating means for bringing the rotatable member into and out of engagement with the flywheel.

When the rotatable member is in engagement with the flywheel, the second drive wheel is coupled to the motor.

Preferably the first drive wheel is mounted so that it can move into and out of the path of the cassette or cartridge when it is inserted into the slot and is spring-urged into the said path.

Preferably the operating means comprises a manually operable control member, there being provided a cam connected to the manually operable control member, and a cam follower connected to the first drive wheel, the arrangement being that upon operation of the manually operable control member, in addition to the rotatable member being brought into engagement with the flywheel, the cam follower moves the first drive wheel out of the said path.

In use, when the first drive wheel is moved out of said path it is no longer in engagement with the said flange of one spool.

Preferably the tape recording and/or replay machines comprises a manually operable reject member which is connected to the cam, an actuating member carried by the cam, and a second cam follower which is connected to the second drive wheel, the arrangement being that upon operation of the manual operable reject member, the cam is moved through a distance greater than that when the manually operable control member is operated the actuating member engages a cassette or cartridge in the slot and moves it in the direction of the mouth of the slot, and the cam followers move the drive wheels out of the said path.

Conveniently the tape recording and/or replay machine comprises guide means for guiding the path of the cam when either of the manually operable members is operated, the path of the cam being such that the second cam follower is not moved during the part of the path through which the cam is moved when the manually operable control member is operated.

Suitably the guide means comprises a pin and a curved slot in the cam through which the pin passes.

According to another aspect of this invention there is provided a cassette comprising a tape, two rotatable spools between which the tape extends and which are located side-by-side, a pinch wheel and a container in which the spools and the pinch wheel are mounted, flanges of the two spools projecting through opposite sidewalls of the container.

According to a further aspect of this invention there is provided a cartridge comprising an endless tape, a pinch wheel, a rotatable spool, guide means for guiding the tape in a path which extends from the inner end of a stack of tape on the spool, past the pinch wheel to the outer end of the stack, and a container in which the spool, the pinch wheel and the guide means are disposed and through one sidewall of which one flange of the spool projects.

A tape replay machine, a cassette and a cartridge in accordance with this invention will now be described, by way of example only, with reference to the accompanying drawings in which.

The overall operation of the replay machine and the cassette will be described first to facilitate understanding the descriptions of the replay machine and the cassette. The replay machine has a rectangular slot into which the cassette, which is of rectangular form, can be inserted. The cassette has two rotatable side-by-side spools which carry a tape which extends between the two spools. The tape has on it two tracks, teaching instructions or other suitable material being recorded on the track so that it can be replayed when the tape is driven in opposite directions, each direction being appropriate for one of the tracks. The cassette is symmetrically constructed and flanges of the two spools project through opposite narrow sides of the cassette. When the cassette is inserted into the machine, the tape is brought against a replay head and is also brought into engagement with the driving capstan, a projecting flange of one of the spools is brought into engagement with a drive wheel which provides the takeup drive whereas a flange of the other spool is engaged by a further drive wheel which is utilized for rewind. The rewind drive wheel is normally not driven and provides a restraint when the takeup drive wheel is driven. When rewind is required the rewind drive wheel is driven and the takeup drive wheel is moved out of engagement with its spool.

The tape is driven in one direction and the teaching instructions recorded on one of the tracks are replayed through an amplifier by a loud speaker connected to the replay head until the tape is wholly wound onto the spool which is driven. The cassette may then be removed from the slot, inverted, and reinserted into the slot so that the tape is driven in the opposite direction, and the spool which was previously restrained and not driven is now driven. The tape is wound onto the spool which is now driven and the teaching instructions on the other track is replayed.

Figure 1:
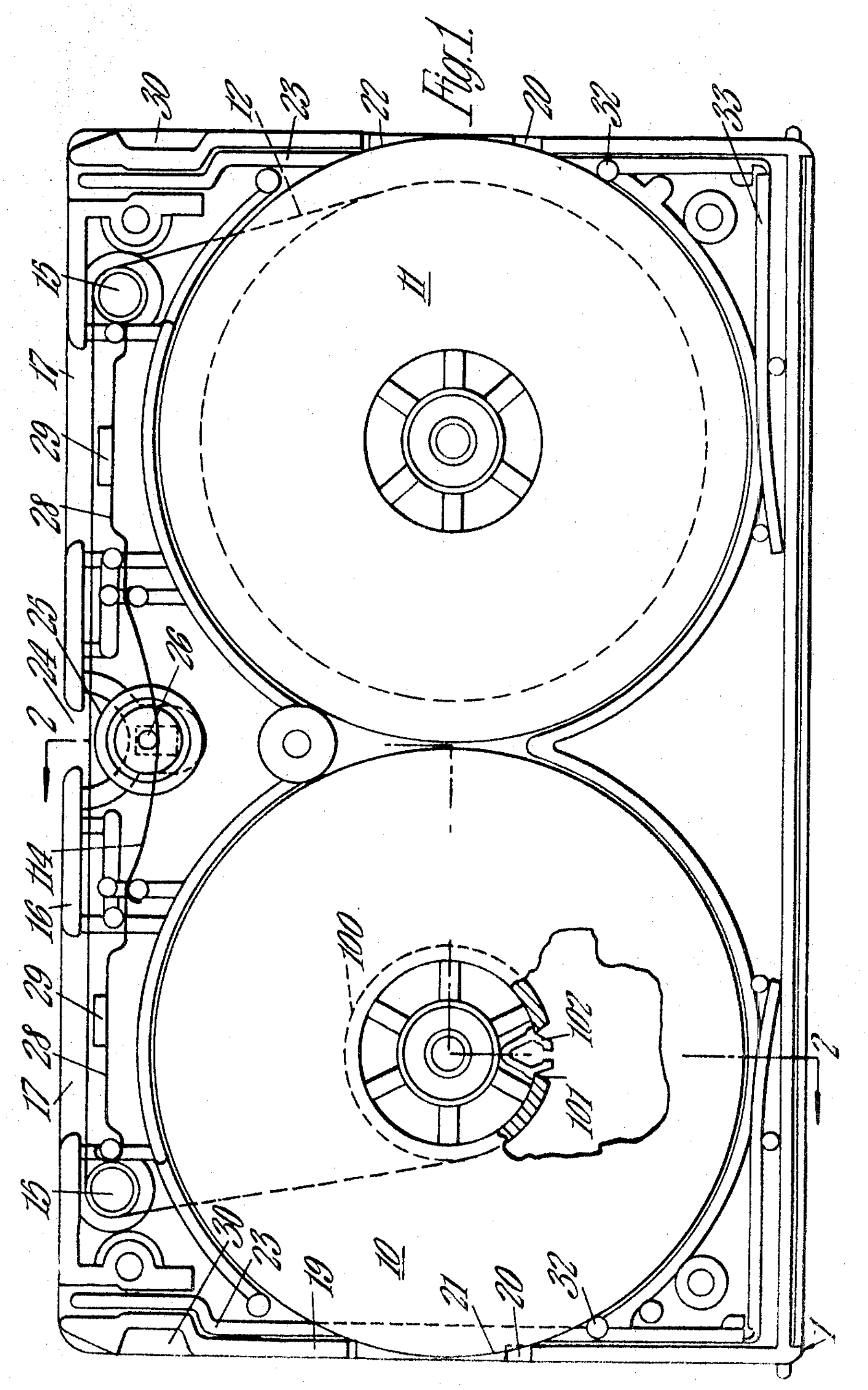
FIG. 1 is a plan view of a cassette 1.
Figure 2:
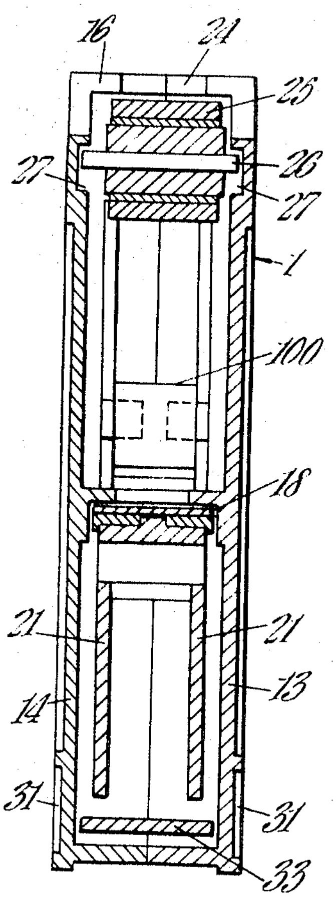
FIG. 2 is a sectional elevation on the line 2–2 of FIG. 1.

Referring now to FIGS. 1 and 2, the cassette is indicated generally by the reference numeral 1, the spools by the reference numerals 10 and 11 and the tape itself by the reference numeral 12. As stated earlier, the cassette 1 is generally rectangular in shape and its casing is made up of two parts 13 and 14 which are fitted together and are held together with pins (not shown). The part of the tape which extends between the two spools 10 and 11 passes over two guideposts 15 disposed in the corners of the cassette 1; the tape extends in a straight line between these two posts and is then adjacent to and parallel to one of the long sidewalls 16 of the cassette 1. This sidewall 16 has two openings 17 through which, as will be described later, a replay head of the replay machine enters the cassette 1 and comes into contact with the tape 12. Each of the spools is rotatable about a pin 18 carried by the two sections 13 and 14. The narrow sidewalls 19 are formed with openings 20 through which the flanges 21 and 22 of the spools 10 and 11 respectively project.

Each spool has a hub 100 from which the flanges (21 or 22) extend and on which the tape 12 is wound. Each hub 100 has a gap 101 in which the tape 12 is secured by a spring slip 102.

A central opening 24 is formed in the wall 16 and immediately behind this opening 24 a pinch roller 25 is located. The pinch roller 25 is carried on a nonrotatable staff 26 which is movable in grooves 27 which extend longitudinally in the parts 13 and 14 along the line 2–2, that is to say in the direction of insertion of the cassette into the slot in the replay machine. A leaf spring 114 (not shown in FIG. 2) which urges the pinch wheel staff 26 towards the opening 24 engages the staff 26 above and below the pinch wheel 25 and will thus accommodate some movement of the top end of the staff 26 in relation to its bottom end. When the cassette 1 is inserted into a slot in the replay machine a capstan (which will be described later) enters the opening 24, engages the tape 12 where it is in contact with the pinch wheel 25 and forces the pinch wheel 25 away from the opening 24 against the action of the spring 114.

Two leaf springs 28 each carry a felt pad 29 which is located behind the tape 12 as it extends across one of the openings 17. When the replay head extends into one of the openings 17, the tape 12 is held against the replay head by the appropriate felt pad 29. The parts 13 and 14 are formed with longitudinal grooves 31 which extend across the external surfaces of these parts at their front ends; the grooves 31 are utilized to handle the cassette 1 when it is inserted into, and when it is removed from, the slot in the replay machine. The walls 19 are also formed with indentations 30 in line with the guide pins 15 and the purpose of these indentations will be described later. A push bar 23 extends along the inner side of each wall 19 and carries a pin 32 which is urged into engagement with the flanges of the appropriate spool by a leaf spring 33 integral with the push bar 23. When the cassette 1 is out of the slot in the replay machine the engagement of the pins 32 with the flanges 21 and 22 of the spools 10 and 11 prevents rotation of the spools and so that the pins 32 act as a brake. When the cassette 1 is inserted into the slot in the replay machine the ends of the push bars 23 engage abutments in the replay machine which push the push bars 23 away from the wall 16 against the action of the springs 33 and bring the pins 32 out of engagement with the spools 10 and 11 so that the spools 10 and 11 are released and can rotate.

Figure 5:
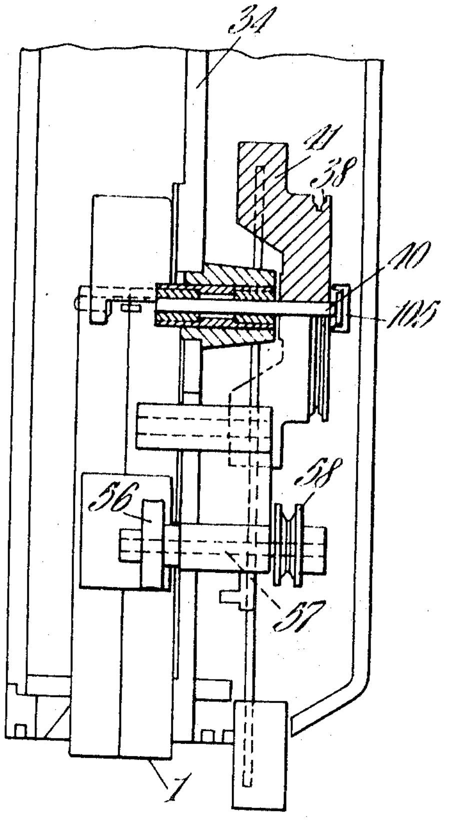
FIG. 5 is a partial sectional elevation on the line 5–5 of FIG. 3 showing some of the components of the transmission to the drive wheel 56.
Figure 3:
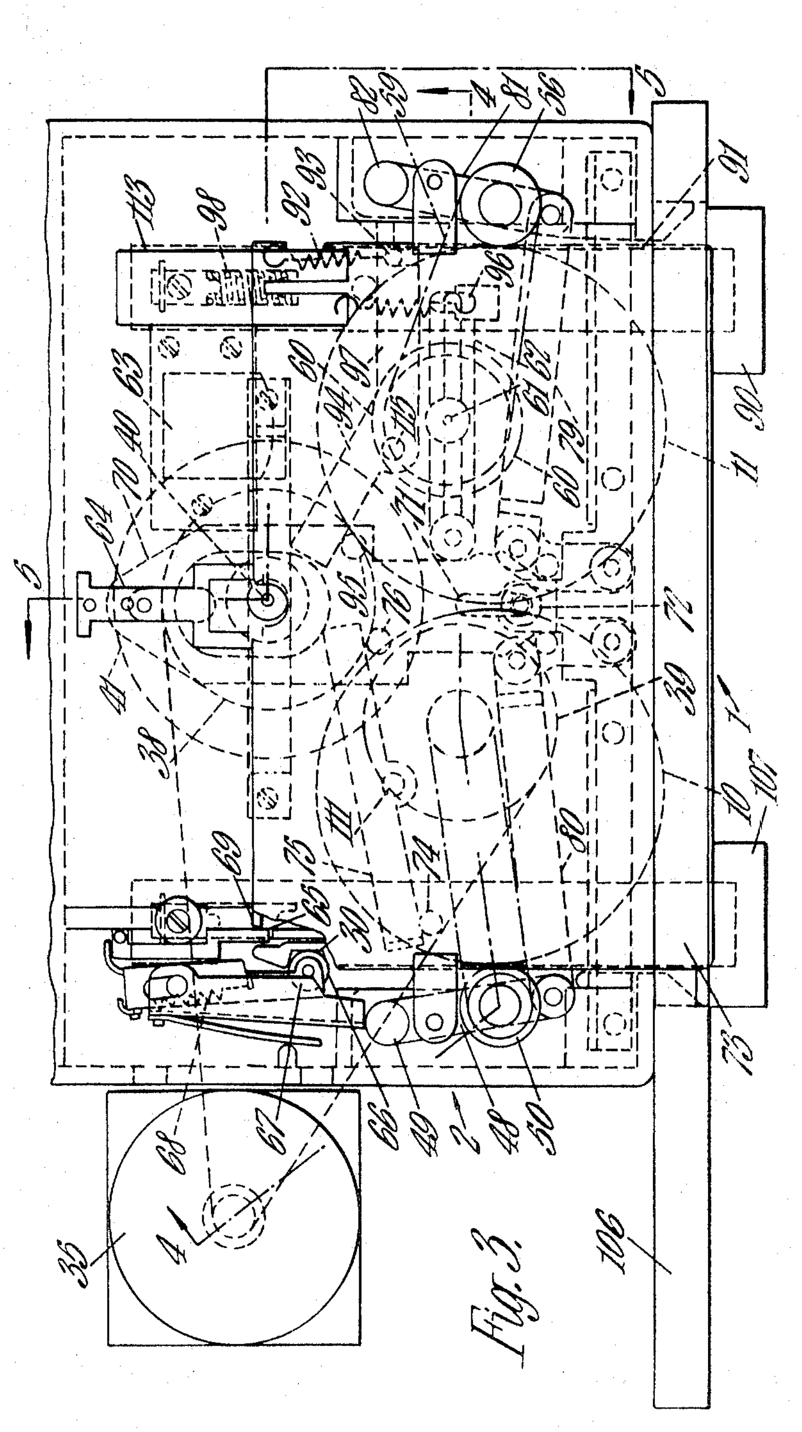
FIG. 3 is a plan view of a replay machine 2.
Figure 4:
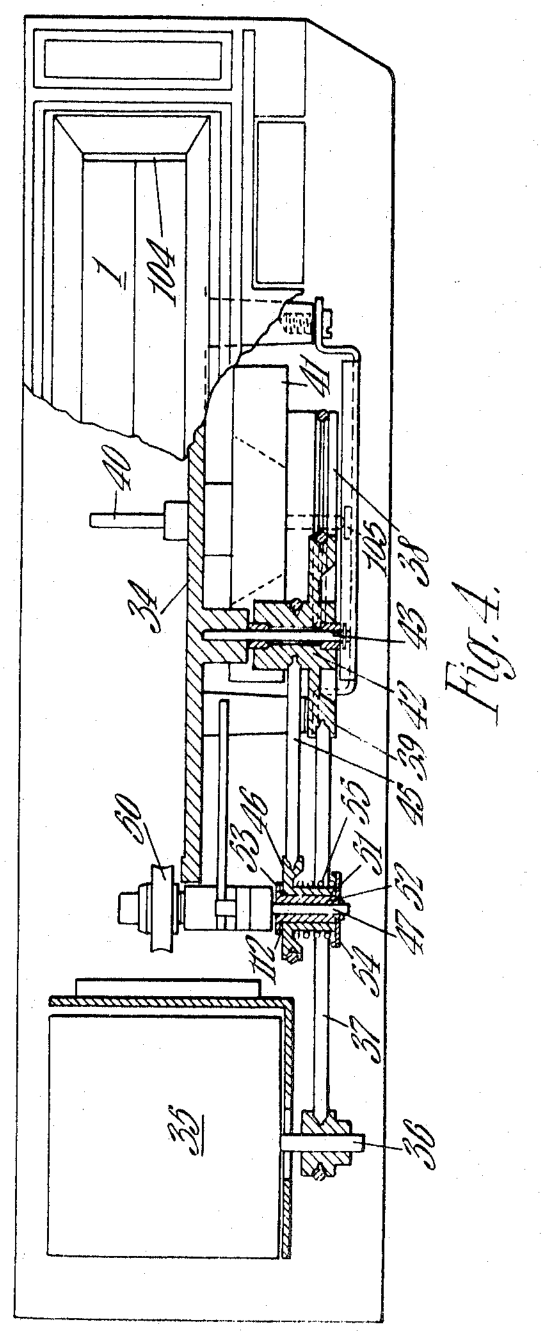
FIG. 4 is a partial sectional elevation on the line 4–4 of FIG. 3 showing some of the components of the transmission to the drive wheel 50.

Referring now to FIGS. 3 to 6 the replay machine is generally indicated by the numeral 2. In FIG. 3 the spools 10 and 11 are indicated in outline but not the tape 12; the cassette 1 as a whole is indicated in FIGS. 3, 4, and 5. The replay machine 2 has a central horizontal platform 34 on the upper side of which (the left side in FIG. 5) the slot 104 into which the cassette 1 is inserted is formed, and which carries on its lower side the transmission components of the replay machine 2.

The replay machine 2 has a motor unit 35, which will be described in more detail later and which drives its output shaft 36 at a constant speed. The output shaft 36 and the transmission components of the replay machine 2 are, as previously stated, disposed beneath the plate 34 and these components are therefore indicated in the dotted outline in FIG. 3. The drive shaft 36 carries a pulley which is engaged by a drive belt 37 which also engages two further pulleys 38 and 39; the pulley 38 is mounted on the capstan 40 and is integral with a flywheel 41. The bottom end of the capstan 40 bears against an end bearing 105 which is of carbon, the capstan 40 itself being of chemically treated carbon chrome and it has been found that this arrangement gives very little wear. Upward movement of the capstan 40 and the flywheel 41 is prevented by the platform 34. The pulley 39 is integral with a further pulley 42 itself rotatable about a fixed shaft 43 carried by the plate 34. A further drive belt 45 couples the pulley 42 to a pulley 46 which is coupled to a shaft 47 through a clutch which will be described. The shaft 47 is itself carried by an arm 48 pivoted at one end about a stud 49 projecting from the casing of the machine 2; a torsion spring (not shown) secured to the stud 49 and the arm 48 urges the arm 48 in the anticlockwise direction about the stud 49 (as seen in FIG. 3). The shaft 47 also has secured to it a drive wheel 50 which, when the cassette 1 is fully inserted into the replay machine 2 (as illustrated in FIGS. 3 to 5) engages the flange 21 of the spool 10 (this latter feature is not shown in FIG. 4). In normal use, the pulleys 39, 42 and 46, the shaft 47 and the wheel 50 rotate continuously with the wheel 50 in engagement with the flange 21 so the spools 10 and 11 are continuously rotated. As previously stated the drive from the pulley 46 to the shaft 47 is through a clutch the purpose of this clutch being to permit the takeup drive wheel 50 to slip with respect to the pulley 46 as is required when the capstan drives the tape 12 at a slower speed than the takeup drive wheel 50. The pulley 46 is integral with a sleeve 51 which surrounds a further sleeve 52 secured to the shaft 47. The sleeve 52 is provided, at one end, with an integral flange 53 adjacent to the pulley 46 and has attached to it, at its other end, a thrust plate 54. A felt washer 112 rests against the flange 53. A spring 55 extends between the thrust plate 54 and the pulley 46 and urges the pulley 46 against the flange 53. The engaging surfaces of the pulley 46, the felt washer 112, and the flange 53 act as the friction surfaces of a friction clutch and the normal transmission of power is through these surfaces. Thus power is transmitted from the drive belt 45 to the wheel 50 through the pulley 46, the felt washer 112, the flange 53 and the shaft 47.

The drive wheel which is utilized for rewind is indicated at 56 and is mounted on a shaft 57 which also carries a pulley 58. The pulley 58 is coupled by a drive belt 59 (only shown in FIG. 3) to a further drive wheel 60 mounted on a shaft 61; the shaft 61 is carried by a lever 62 itself rotatable about its left end. The shaft 61 also carries a drive wheel (not shown) which upon rotation of the lever 62 in the anticlockwise direction about its left end is brought into engagement with the flywheel 41. When this occurs drive is transmitted from the flywheel 41 through the drive wheel 60, the drive belt 59, and the pulley 58 to the wheel 56. When the cassette 1 is fully inserted into the machine 2 as illustrated in FIGS. 3 to 5 the drive wheel 56 engages a flange 22 of the spool 11. In the position of the lever 62 shown no drive is transmitted to the wheel 56 and, in normal operation, the wheel 56 is driven by flange 22 of the spool 11 and provides some restraint to rotation of the spools 10 and 11 and consequently acts as a tape tensioner.

The shaft 57 is carried by an arm 81 which is rotatable about a stud 82 at its upper end. A torsion spring (not shown) secured to the stud 82 and the arm 81 urges the arm 81 in the clockwise direction about the stud 82.

The replay head of the machine 2 is indicated at 63 and, as previously explained, when the cassette 1 is introduced into the slot 104 to the required extend this head enters the appropriate opening 17 and engages the tape 12. Furthermore as the cassette 1 is introduced into the slot the capstan 40 enters the opening 24 in the cassette and forces the pinch wheel 25 backwardly so that the tape 12 is gripped between the capstan 40 and the pinch wheel 25; in this condition when the capstan 40 is rotated by the motor unit 35 the tape 12 is driven.

A slidable fork 64 is mounted behind the capstan 40 with its two prongs extending on each side of the capstan 40 and when a cassette 1 is introduced into the slot 104 fully the fork 64 is slid backwardly. The fork 64 is arranged to operate a microswitch (not shown) located immediately behind it the arrangement being that when a cassette 1 is pushed fully into the slot the fork 64 is slid backwardly and operates the microswitch to switch the replay machine on.

The casing of the replay machine 2 is formed with two forwardly projecting abutments 65 (only one of which is shown in FIG. 3) and these abutments 65 are engaged by the pushrods 23 of a cassette when it is pushed into the slot 104.

On each side of the replay machine a roller 66 (only one roller 66 is shown) is carried by a pivoted arm 67 which is urged by a spring 68 so as to bring the roller 66 into the path of the edge of a cassette as it is introduced into the slot. These rollers 66 are pushed outwardly by the front edge of the cassette and engage the indentations 30 and thereby locate the cassette in the slot 104. The forces exerted by the springs 68 are such that the cassette is held against two abutments 69 (only one of which is shown). It will be appreciated that this arrangement is advantageous as it is only necessary to locate accurately the abutments 69 in relation to the replay head 63 and the capstan 40. The capstan 40 must, of course, be located accurately with respect to the replay head 63 but any malpositioning will be taken up by the spring 114 which permits movement of the pinch roller staff 26.

Two horizontal plates 113 (only one plate 113 is shown in FIG. 3) limit the upward movement of the inner end of the cassette 1 as it is introduced in the slot 104.

The overall operation of the parts of the replay machine 2 which have so far been described will be clearly understood. The cassette 1 to be replayed is inserted into the slot in the replay machine 2 to the extend possible and the machine immediately begins to operate. The tape 12 is driven by the capstan 40 and simultaneously the spool 10 whose flange 21 is engaged by the wheel 50 is driven to take up the tape while the other spool is restrained to some extend by the wheel 56 in engagement with its flange. The speed at which the takeup spool needs to be driven varies in accordance with the quantity of the tape would onto that spool. The pulley 46 is always driven at a maximum speed required for the takeup spool, this maximum speed being, of course, required when there is a minimum of tape wound onto the spool and in all other conditions slip takes place between the engaging surfaces of the pulley 46, the felt pad 112 and the flange 53 to take up the difference between the speed at which the drive wheel 50 is required to be driven and that at which the pulley 56 is actually driven.

An amplifier is provided which may be located between the motor assembly 35 and the fascia 106 of the replay machine 2. The volume control may be provided by a knob in conventional manner, this knob not being shown. Two amplifiers may be provided for stereo operation of the replay machine and for this purpose the knob may be in two parts which are separately rotatable when the machine is constructed for stereo operation to individually control the output of the two amplifiers in conventional manner. Provision for stereo operation will only be made when the tape has music recorded on it.

The machine utilizes modular construction the amplifier constituting a module, and the motor unit 35 constituting a module. The motor is a DC shunt motor having a nominally constant speed and is provided with an integral mechanical governor and/or a speed control circuit. This speed control circuit is in the form of a block attached to the side of the motor with which it forms the unit 35, the block being formed by moulding a plastics material about the control circuit. The speed control circuit consists of a square wave oscillator having a variable mark/space ratio the power supply to the motor being cut off during the "space" and the mark/space ratio being varied to keep the motor speed constant. The feedback to this circuit utilizes the back e.m.f. of the motor which is, of course, proportional to the motor speed.

A cam plate 70 is secured to the fork 64, mounted for longitudinal sliding and formed with a slot 71 which is specially shaped for a purpose which will be described and which engages a pin 72 secured to the body of the replay machine 2. A pushrod 73 is mounted at the left side of the replay machine 2 and carries a pin 74 which engages one end of the lever 75; the lever 75 is pivoted at its midpoint 111 and at its other end engages a pin 76 carried by the cam plate 70. Consequently when an eject knob 107 secured to the front end of the pushrod 73 is depressed the lever 75 is rotated in the clockwise direction about its midpoint and thereby slides the cam plate 70 forwardly that is to say towards the mouth of the slot 104. As the cam plate 70 is secured to the fork 64 the forward movement of the cam plate 70 is transmitted to the fork 64 which forces the cassette 1 out of the replay machine 2 to the extent that it is no longer held by the rollers 66, the movement of the fork 64 also operating the microswitch switching the replay machine off.

Figures 6, 7:
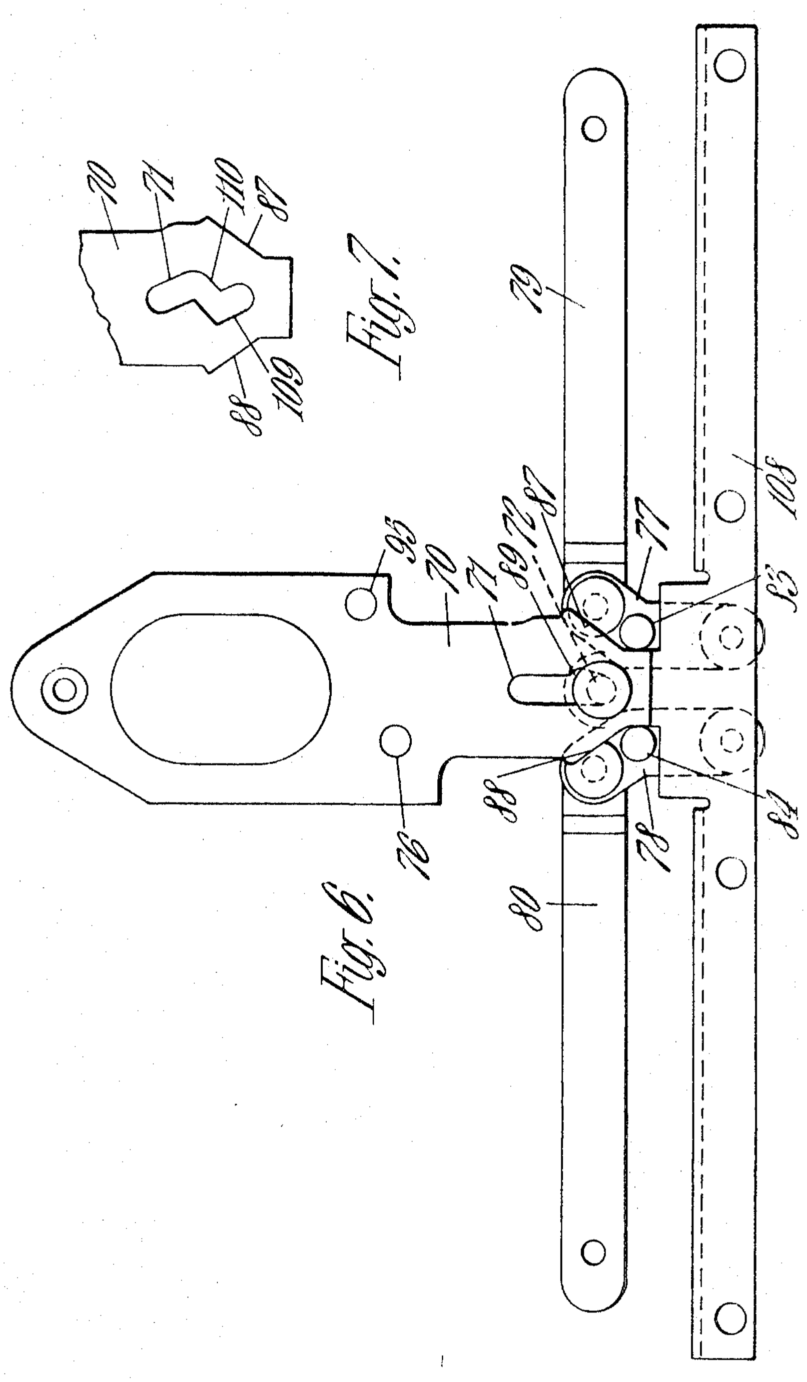
FIG. 6 is a plan view of a linkage mechanism forming part of the replay machine.
FIG. 7 is a partial view of a modified cam plate 70 which is a component of the linkage.

Referring now also to FIG. 6 the pin 72 is carried by a bracket 108 which is secured to the platform 34 of the replay machine 2. Two links 77 and 78 are pivoted to the bracket 108 and the ends of these links 77 and 78 are pivoted respectively to further links 79 and 80. The ends of the links 79 and 80 are pivoted to the ends of the arms 81 and 48 respectively. The links 77 and 78 carry cam followers 83 and 84 respectively which respectively engage cam surfaces 87 and 88 of the cam plate 70. Consequently as the cam plate 70 is pushed outwards by the action of the lever 75 against the pin 76 cam surfaces 87 and 88 force the links 79 and 80 outwardly and thereby cause the arms 48 and 81 to rotate about their pivots 49 and 82 respectively; rotation of the arms 48 and 81 in this manner brings the drive wheels 50 and 56 out of the path of the cassette 1 so that the outward movement of the cassette 1 is not impeded when the user presses the knob 107. When a cassette 1 is again fully inserted into the slot 104 the cam plate 70 moves inwards together with the fork 64 as has already been explained. The links 79 and 80 are then permitted to move towards each other under the action of the torsion springs which are not shown and which act on the arms 81 and 48 respectively. Thus the drive wheel 56 is brought into engagement with the flange of the spool 11 and the drive wheel 50 into engagement with the takeup spool. Further the cam follower 83 and 84 are maintained in engagement with the cam surfaces 87 and 88 respectively.

The slot 71 in the cam plate is not straight but has an indentation 89 on the opposite side of its centerline to the pin 76. As this indentation 89 is on the opposite side of the centerline of the slot 71 to the pin 76 the motion of the cam plate 70 when a force is exerted on the pin 76 is unaffected by the existence of the indentation 89; this indentation 89 has a purpose which will be described later.

A knob 90 is attached to a pushrod 91 which extends from the front to the back of the replay machine 2 and is depressed whenever rewind is required. Rewind is the action of causing the tape to be wound back for a distance to be determined by the user. A spring 92 connects the pushrod 91 to a lever 94 arranged to pivot about a pin 115 at its midpoint. The pushrod 91 also carries a pin 93 which is engageable with the end of the lever 94 for a purpose which will be described later. The end of the lever 94 engages a pin 95 carried by the cam plate 70 on the same side of its centerline as the indentation 89. The cam surface 87 is parallel to part of the indentation 89 so that when the cam plate 70 is moved outwardly as a result of a force being exerted on the pin 95 by the lever 94 the roller 83 is not moved at all. Consequently the link 79 is not moved and the drive wheel 56 remains in engagement with the flange of the appropriate spool. However the link 80 is moved as a result of the engagement of the cam surface 88 with the roller 84 and moves the takeup drive wheel 50 out of engagement with the takeup spool. The velocity ratio of the lever 94 is less than that of the lever 75 with the result that the pin 72 remains in engagement with the part of the indentation 89 which is parallel to the cam surface 87 when the cam plate 70 is moved by the lever 94 and the pin 72 never comes into engagement with the inner end of the slot 71. Furthermore the cassette 1 is not moved forwardly to the extent that it is no longer held by the rollers 66 and the fork 64 is not moved to the extent that the microswitch is operated.

The lever 62 is attached to the pushrod 91 through a spring 97 so that when the pushrod 91 is moved upon the knob 90 being pushed the lever 62 is rotated about its left end in the anticlockwise direction. This movement of the lever 62 brings the wheel 60 into engagement with the flywheel 41 so that the wheel 60 is rotated, this rotation of the wheel 60 being transmitted through the belt 59 to the drive wheel 56 which remains in engagement with the spool 11.

The overall effect of depressing the knob 90 is as follow. The cam plate 70 and the fork 64 are moved outwardly (i.e. in the direction of removal of the cassette 1) through a small distance releasing the tape 12 so that it is no longer gripped between the capstan 40 and the pinch wheel 24 and between the replay head 63 and the felt pad 29. Further the drive roller 50 is moved out of engagement with the spool 10 so that the tape is no longer driven in the forward direction. The drive wheel 56 is not moved but drive is applied to it from the capstan 40 through the wheel 60, the belt 59 and the pulley 58. The drive to the drive wheel 56 causes the spool 11 to rotate in the direction to effect rewind.

As soon as the movable pushbutton 90 is released it is returned to its datum position by a spring 98 which acts on the pushrod 91. The pin 93 on the pushrod returns the lever 94 to its datum position and simultaneously a further pin 96 carried by the lever 62 and located in a slot in the pushrod 91 transmits the motion of the pushrod 91 to the lever 62 which is returned to its datum position. Simultaneously the rollers 66 return the cassette 1 to its fully inserted position; it is to be noted that these rollers 66 never move entirely out of engagement with the indentations 30. The return movement of the cassette pushes the fork 64 backwardly; the fork 64 in turn moves the cam plate 70 back to its original position releasing the link 80. The arm 48 is then rotated back to the position in which the drive wheel 50 engages the appropriate spool by the spring attached to the arm 48.

In an alternative arrangement illustrated in FIG. 7 the slot 71 has the shape illustrated in that figure. The advantage of this is that the part 109 of the slot nearest to the fascia 106 is parallel to the cam surface 88 whereas the next part 110 is parallel to the cam surface 87. When the knob 90 is depressed the overall effect is that the wheel 56 is not moved out of engagement with the spool 11 whereas the wheel 50 is moved out of engagement with the spool 10. When the knob 90 is released the initial movement of the cam plate 70 brings the takeup drive wheel 50 back into engagement with the flange of the spool 10 and only subsequently is the cassette itself moved back to the position where the tape 12 is engaged by the capstan 40. This arrangement has the advantage that the capstan 40 does not come into engagement with the tape 12 before the takeup drive wheel 50 engages the appropriate flange. If the takeup drive spool 50 comes into engagement with the appropriate flange after the capstan 40 begins to drive the tape 12 the tape may be drawn off the spool 11 without being wound onto the spool 10 and this may cause damage to the tape 12.

Figure 8:
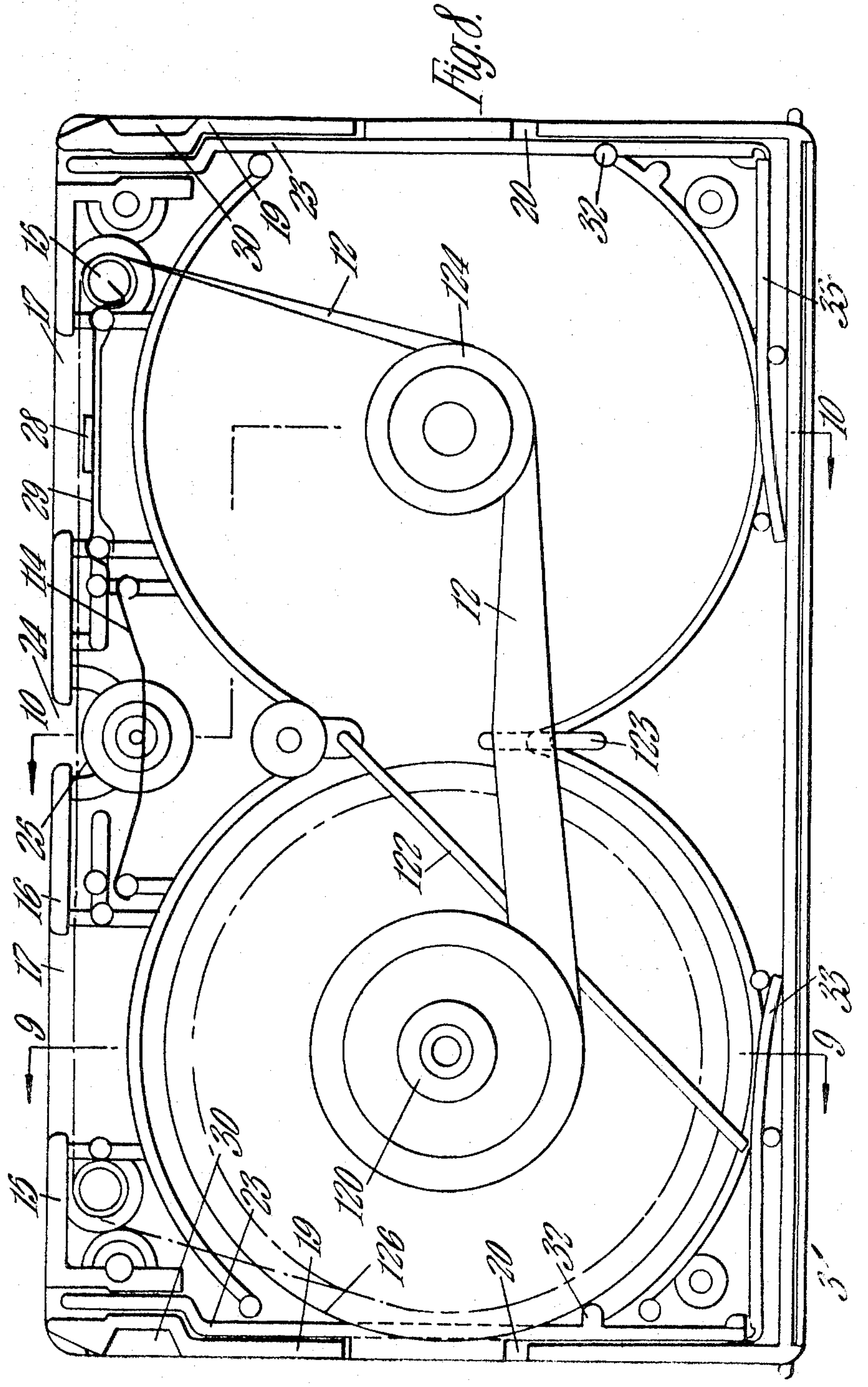
FIG. 8 is a plan view of a cartridge 3.
Figure 9:
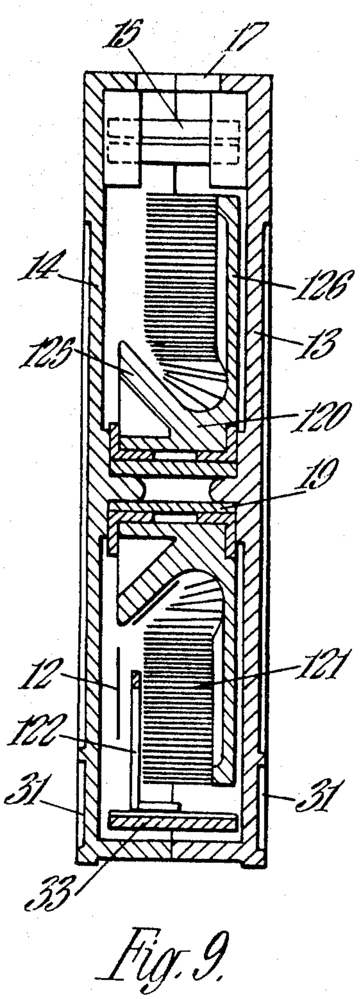
FIG. 9 is a sectional elevation on the line 9–9 of FIG. 8.
Figure 10:
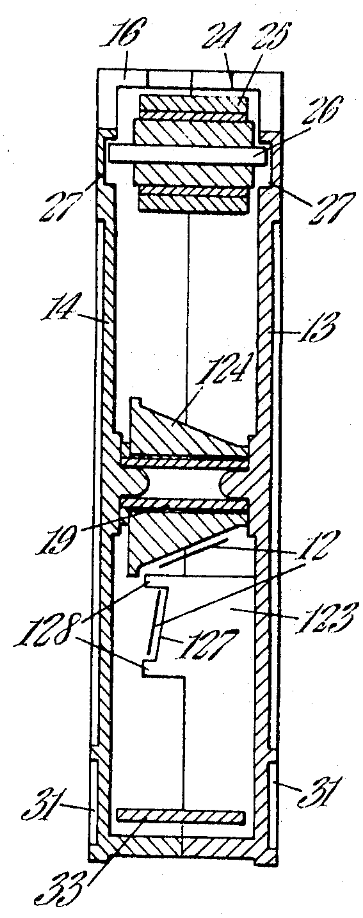
FIG. 10 is a sectional elevation on the line 10–10 of FIG. 8.

FIGS. 8 to 10 show a cartridge 2 which can be used with the tape replay machine 2 instead of the cassette 1 shown in FIGS. 1 and 2.

Those parts common to the cassette and the cartridge are denoted by the same reference numerals and will not be described.

The cartridge 3 has an endless loop of tape 12 which is preferably but not necessarily lubricated and which is wound onto a single freely rotatable spool 120 which is mounted in the position of the takeup spool 10 of the cassette 1. The tape 12 is in use drawn off the inner turn of the stack 121 of the tape 12 on the spool 120, passes over a guide wire 122, over a guide rib 123 around a freely rotatable guide roller 124, which is mounted in the position of the supply spool 11 of the cassette 1, around one guide pillar 15, between the pad 28 and the opening 17, between the pinch wheel 25 and the opening 24, around the other guide pillar 15 and is wound onto the outer turn of the stack 121.

The spool 120 is shown in FIG. 9 and has a hub 125 from which extends a single flange 126 which supports the stack 121 of the tape 12. The hub 125 is outwardly played at the end opposite the flange 126 so that the tape 12 is turned through a right angle as it is drawn off the stack 121 so as to be parallel to the flange 126. The guide wire 122 which is parallel to the flange 126 assists in this action.

The guide rib 123 and the roller 124 are clearly shown in FIG. 10 and it will be seen that the guide rib 123 provides a guide surface 127 which is at a small angle with the plane of the flange 126. Lateral movement of the tape 12 when in engagement with the surface 127 is prevented by two shoulders 128 projecting from the rib 123. The roller 124 is frustoconical in shape and provides a guide surface which is at an angle to the flange 126 somewhat greater than that of the plane of the surface 127. The guide rib 123, the roller 124 and the guide pillar 15 shown at the top right-hand corner of FIG. 8 together turn the tape 12 back to the plane in which it is parallel to the end wall 16.

The flange 126 projects through the opening 20 and it is necessary to insert the cartridge 3 into the slot 104 in the tape replay machine 2 in the attitude in which the flange 126 is engaged by the drive wheel 50 and, consequently, only one felt pad 28 is provided. As can be seen the roller 124 has no flange which projects through the adjacent opening 20.

A push bar 23, a pin 32, and a leaf spring 33 are associated with the spool 120 and perform a braking function as has already been described in connection with the cassette 1. These components are also provided for the roller 124 but are, of course, inoperative.

The cartridge 3 has the same casing parts 13 and 14 as the cassette 1 and, for this reason, various inoperative openings and parts exist in the cartridge 3.

In use, when the cartridge 3 is fully inserted into the slot 104, the tape 12 is drawn off the stack 121 on the spool 120 by the capstan 40 and passes between the felt pad 28 and the replay head 63 so that the audio signals recorded on the tape 12 are replayed. The tape 12 is wound onto the stack 121 on the spool 120, the spool 120 being rotated by the combined action of the capstan 40 drawing the tape 12 from the stack 121 and the drive wheel 50. It is because the flange 126 is driven by the drive wheel 50 that the tape 12 need not be lubricated.

I claim:

1. A tape recording and/or replay machine comprising a slot into which it is intended that there shall be inserted a cassette comprising a tape, two rotatable spools between which the tape extends and which are located side-by-side, a pinch wheel and a container in which the spools and the pinch wheel are mounted, flanges of the two spools projecting through opposite sidewalls of the container or a cartridge comprising an endless tape, a pinch wheel, a rotatable spool, guide means for guiding the tape in a path which extends from the inner end of a stack of tape on the spool, past the pinch wheel to the outer end of the stack, and a container in which the spool, the pinch wheel and the guide means are disposed and through one sidewall of which one flange of the spool projects, the machine including a replay head connected to a loudspeaker, a motor, a capstan coupled to the motor, a first drive wheel urged into engagement with the projecting flange of one spool when a cassette is inserted into the slot and into engagement with the projecting flange of the spool when a cartridge is inserted into the slot, a transmission interconnecting the first drive wheel and the motor, and a second drive wheel which is urged into engagement with the projecting flange of the other spool when a cassette is inserted into the slot, and means for coupling the second drive wheel to the motor and for moving the first drive wheel out of engagement with the said flange of one spool, the first and second drive wheels serving to cause the tape to be driven in opposite directions.

2. A tape recording and/or replay machine as claimed in claim 1 wherein the second drive wheel is mounted so that it can move into and out of the path of the cassette or cartridge when it is inserted into the slot and is spring urged into the said path.

3. A tape recording and/or replay machine as claimed in claim 1 wherein the said means include a flywheel coupled to the motor, a rotatable member, a belt transmission which couples the rotatable member to the drive wheel and operating means for bringing the rotatable member into and out of engagement with the flywheel.

4. A tape recording and/or replay machine as claimed in claim 3 wherein the first drive wheel is mounted so that it can move into and out of the path of the cassette or cartridge when it is inserted into the slot and is spring urged into the said path.

5. A tape recording and/or replay machine as claimed in claim 4 wherein the operating means comprise a manually operable control member, there being provided a cam connected to the manually operable control member, and a cam follower connected to the first drive wheel, the arrangement being that upon operation of the manually operable control member, in addition to the rotatable member being brought into engagement with the flywheel, the cam follower moves the first drive wheel out of the said path.

6. A tape recording and/or replay machine as claimed in claim 5 which includes a spring which urges the manually operable control member to a nonoperative datum position.

7. A tape recording and/or replay machine as claimed in claim 5 which comprises a manually operable reject member which is connected to the cam, an actuating member carried by the cam, and a second cam follower which is connected to the second drive wheel, the arrangement being that upon operation of the manual operable reject member, the cam is moved through a distance than that when the manually operable control member is operated, the actuating member engages a cassette or cartridge in the slot and moves it in the direction of the mouth of the slot, and the cam followers move the drive wheels out of the said path.

8. A tape recording and/or replay machine as claimed in claim 7 which comprises guide means for guiding the path of the cam when either of the manually operable members is operated, the path of the cam being such that the second cam follower is not moved during the part of the path through which the cam is moved when the manually operable control member is operated.

9. A tape recording and/or replay machine as claimed in claim 8 wherein the guide means comprise a pin and a curved slot in the cam through which the pin passes.

10. A tape recording and/or replay machine as claimed in claim 1 and intended to be used with a cassette or cartridge formed with grooves, and which comprises rollers spring urged into the path of a cassette or cartridge inserted into the slot, the rollers being arranged to engage the said grooves upon the insertion of a cassette or cartridge into the slot.

11. A tape recording and/or replay machine as claimed in claim 10 which comprises a stop member which limits the movement of a cassette or cartridge inserted into the slot, the stop member being so located that, when a cassette or cartridge is released when in contact with the stop member, the rollers engage the grooves and locate the cassette or cartridge.

12. A tape recording and/or replay machine as claimed in claim 9, wherein the axis of rotation of the capstan is fixed, the tape replay machine being intended to be used with a cassette or cartridge which has a pinch roller so mounted as to permit movement.

13. A tape recording and/or replay machine as claimed in claim 1 and intended for use with a cassette or cartridge having a tape brake which has a projecting brake operating member, and which comprises a fixed member which is engaged by the brake operating member to release the brake when the cassette or cartridge is inserted into the slot in the machine.

14. A cassette for use with a tape recording and/or replay machine as claimed in claim 1, which comprises a tape, two rotatable spools between which the tape extends and which are located side-by-side, a pinch wheel and a container in which the spools and the pinch wheel are mounted, flanges of the two spools projecting through opposite sidewalls of the container.

15. A cassette as claimed in claim 14 wherein the pinch wheel is spring mounted.

16. A cassette as claimed in claim 14 which comprises a brake arranged to prevent rotation of the spools, the brake having at least one operating member which is intended to engage a fixed member of the tape recording and/or replay machine when the cassette is inserted into the tape recording and/or replay machine, engagement of the brake operating member with the fixed member causing the brake to be released.

17. A cassette as claimed in claim 16 wherein the brake is a band brake having an end which projects from the end of the cassette intended to be inserted first into the slot in the tape recording and/or replay machine, the cassette being intended to be utilized with a tape recording and/or replay machine which has a fixed member, which is intended to be engaged by the projecting end of the band brake.

18. A cartridge for use with a tape recording and/or replay machine as claimed in claim 1, which comprises an endless tape, a pinch wheel, a rotatable spool, guide means for guiding the tape in a path which extends from the inner end of a stack of tape on the spool, past the pinch wheel to the outer end of the stack, and a container in which the spool, the pinch wheel and the guide means are disposed and through one sidewall of which one flange of the spool projects.

19. A cartridge as claimed in claim 18 which comprises a brake arranged to prevent rotation of the spools, a brake arranged to prevent rotation of the spools, the brake having at least one operating member which is intended to engage a fixed member of the tape recording and/or replay machine when the cartridge is inserted into the tape recording and/or replay machine, engagement of the brake operating member with the fixed member causing the brake to be released.

20. A cartridge as claimed in claim 19, wherein the brake is a band brake having an end which projects from the end of the cartridge intended to be inserted first into the slot in the tape recording and/or replay machine, the cartridge being intended to be utilized with a tape recording and/or replay machine which has a fixed member, which is intended to be engaged by the projecting end of the band brake.